United States Patent Office 3,801,475
Patented Apr. 2, 1974

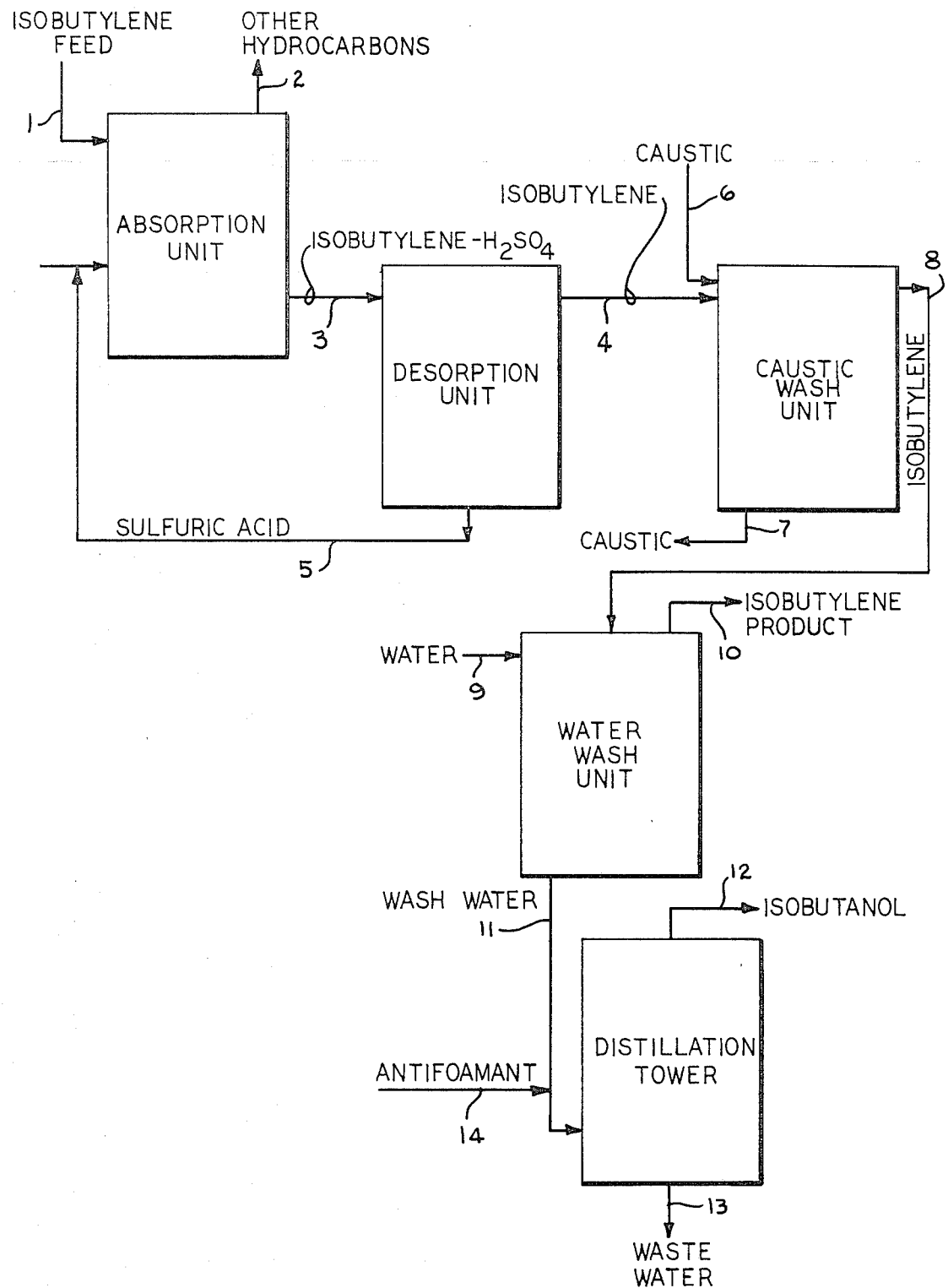

3,801,475
ANTI-FOAMING PROCESS BY THE ADDITION OF
A QUATERNARY AMMONIUM SALT
William H. Taylor, Houston, Tex., assignor to Petro-Tex
Chemical Corporation, Houston, Tex.
Filed Dec. 19, 1969, Ser. No. 886,761
Int. Cl. B01b 1/02
U.S. Cl. 203—20 16 Claims

ABSTRACT OF THE DISCLOSURE

Foaming in the distillation of polar materials from water can be curtailed by adding between 20 and 200 p.p.m. of dialkyl dicoco quaternary ammonium salt to the material to be distilled preferably prior to the beginning of the distillation.

This invention relates to the inhibition or reduction of foaming in aqueous media. More specifically it relates to the inhibition or reduction of foaming in aqueous media that contain polar compounds. Even more specifically, the present invention relates to the inhibition or reduction of foaming by the use of solid water dispersible defoaming compositions. The present invention is particularly useful in the prevention of foaming in distillation columns.

Foaming very often readily occurs in aqueous solutions of many low molecular weight polar compounds such as amines, acids, alcohols, and the like. The throughput capacity of distillation towers has always been seriously limited because of the tendency of such aqueous solutions undergoing distillation to foam or froth particularly at high vapor rates. This foaming has been associated with the surface tension characteristics of the particular liquids under the distillation conditions in use and appears to be extremely sensitive to the vapor velocities in the tower. Foaming in a distillation tower can reduce the effectiveness of the tower since adequate separation of the vapors from the liquid on the distillation trays becomes impossible. If the foaming is allowed to continue, the foam usually becomes sufficiently prevalent that it is carried over from the distillation column along with the material being distilled, thus effectively flooding the unit which may require that the unit be shut down in order to regain the equilibrium necessary for effective distillation.

One solution to the suppression of foaming in distillation towers has been the introduction of chemical antifoaming agents into the tower. Generally, these agents are substances which have a low surface tension thus causing any foam bubbles that are produced to be unstable and allowing the foam to be readily dispersed. It has been found that the use of chemical anti-foaming agents is, if the appropriate agent can be found, the simplest and most economical manner of preventing foaming in a distillation tower since extensive additional equipment or treatment is not necessary. Usually, the only additional equipment is some means of adding the anti-foaming agent to the material being distilled which is often easily done through existing piping. Thousands of compositions for the control of foam have been manufactured and utilized in diverse industrial applications. Principal among active anti-foaming agents are compositions such as the complex amine compounds, the silicones, fatty acids, high fatty alcohols, and the like.

Foaming has become a significant problem in the recovery of tertiary butyl alcohols from aqueous wash water streams resulting from isobutylene purification processes. The most common commercial method of purifying isobutylene streams is to absorb the dilute stream of isobutylene in sulfuric acid. The isobutylene is preferentially absorbed from the other hydrocarbons. This is followed by desorption, caustic washing, and water washing. In the process of desorption some of the absorbed isobutylene is converted to tertiary butyl alcohol which is dissolved in the wash water along with small amounts of alkyl sulfates and polymer (principally di- and tri-isobutylene). The presence of these materials prevents the disposal of the water streams to sewage because of the potential pollution problem. There is also an economic incentive to recover the tertiary butyl alcohol which can be recycled to a sulfuric acid treatment for conversion to isobutylene or sold per se as a product. Normally the wash water streams will contain small amounts of tertiary butyl alcohol, i.e. less than 10 percent by weight. The tertiary butyl alcohol is typically recovered from the wash water stream in a continuous distillation, usually in a distillation tower having 50 to 100 trays. The distillation can be conducted at atmospheric or sub or super atmospheric pressures.

The presence of the polar organic compound alone is sufficient to cause foaming but in the stream described immediately above, foaming is further enhanced by the presence of low concentrations, e.g. less than about 2000 p.p.m. of the alkyl sulfate.

The drawing is a schematic representation of isobutylene recovery and purification and the subsequent removal of isobutanol from the wash water using the antifoamant according to the present invention.

Briefly stated, the present invention is a process for suppressing foam in an agitated aqueous solution of polar material comprising adding a foam suppressing quantity of a mixture of quaternary ammonium salts of the structure

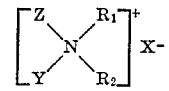

where $R_1$ and $R_2$ are alkyl radicals having 1 to 8 carbon atoms, Z and Y are hydrocarbon radicals having 8 to 18 carbon atoms and X is an anion. Preferably $R_1$ and $R_2$ represent the same alkyl group or groups in each quaternary ammonium salt of the mixture, e.g. $R_1$ and $R_2$ may be the same or different but each salt will preferably have the same $R_1$ and $R_2$ alkyl groups. The quaternary ammonium compounds of the present invention can be conventionally prepared by the reaction of a secondary amine with an alkyl halide.

In a preferred embodiment of the present invention the Z and Y hydrocarbon radicals represent radicals derived from the fatty acids of coconut (copra) oil by using the mixed fatty acids found in coconut oil to prepare the secondary amines which are then converted by the conventional reaction with an alkyl halide to the mixture of quaternary ammonium salts used in the present invention. The quaternary ammonium salts prepared from the mixture of fatty acids found in coconut oil are commonly referred to as dialkyl dicoco quaternary ammonium salts.

The fatty acids found in coconut oil are subject to some variation as is the case in any naturally occurring product depending on the location and conditions of its production in nature and to its subsequent treatment. However, it can be stated that the fatty acids in coconut oil generally comprise 8 to 18 carbon atoms including saturated, monounsaturated and diunsaturated acids.

The anion portion of the quaternary ammonium salt of the present invention is not critical. It is preferred, however, that the anion be a halogen selected, for example, from the group consisting of chlorine, bromine and iodine. Anionic exchange is readily obtained for the present salts by treating an alcoholic solution of the quaternary salt with the sodium salt of the desired anion and precipitating the sodium salt of the starting anion. For example, a dicoco amine reacted with methyl chloride yields the dicoco dimethyl quaternary ammonium chloride. In order to change this to the bromide one reacts the chloride salt in alcoholic solution with sodium bromide precipitating the sodium chloride and removing quaternary bromide salt.

A typical coconut oil composition would be [1]

Saturated acids:
$C_8$—7.9    $C_{14}$—17.5
$C_{10}$—7.2    $C_{16}$—9.0
$C_{12}$—48.0    $C_{18}$—2.1

Monounsaturated acids: $C_{18}$—5.7
Diunsaturated acids: $C_{18}$—2.6

A preferred embodiment of the present invention is an improvement in a continuous process for distilling mixtures of polar organic compounds and water in a fractionating column, wherein the improvement comprises suppressing the formation of foam in the system by adding to said mixtures a foam suppressing quantity of a mixture of quaternary ammonium salts having the structure

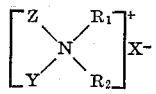

where $R_1$ and $R_2$ are alkyl radicals having 1 to 8 carbon atoms, Z and Y are radicals selected from the group consisting of saturated, monounsaturated and diunsaturated hydrocarbon radicals having 8 to 18 carbon atoms and X is an anion.

In the present invention the quantity of dicoco dialkyl quaternary ammonium salt employed can vary greatly depending on the concentration of polar compound in the aqueous solution. However, in order to obtain any effect in reducing foaming where there is more than a trace amount of polar material in the aqueous system, no less than about 20 parts per million should be used. As the concentration of polar compound or for that matter, other contaminants which are susceptible to foaming in aqueous solutions increases, the quantity of dialkyl dicoco quaternary ammonium salt should also be increased. However, in the usual situation, even under very high concentrations of polar material in aqueous solution no more than about 200 p.p.m. will be necessary. Generally the solutions to be distilled will contain less than 10 percent of the polar compound.

It has been found that in the operation of the present invention the most advantageous operation of the foam suppressing effect is obtained by adding the dialkyl dicoco quaternary ammonium salt to the mixture of polar material and water prior to the mixture being agitated. It has been found once the foam has been allowed to form, that it is extremely difficult to break down the foam that has formed and a much larger quantity of foam suppressing agent is necessary in order to obtain a substantially unfoamed operation. The temperatures at which the present invention operates are rather wide. It is not necessary that the mixture of polar organic compound and water be heated or distilled. Very often merely agitating such mixtures, for example, sending them through particular arrangement of contacting equipment will cause sufficient agitation to produce foam. The process of the instant invention is applicable to preventing or suppressing this type of foam as well as to preventing foaming during a distillation. Thus, generally speaking, it can be stated that the instant process is applicable over the broad range from about 0° C. through temperatures which might be found under super atmospheric pressure, i.e., about 200° C. The following examples will further illustrate the present invention.

---

[1] Kirk-Othmer, Encyclopedia of Chemical Technology, vol. 8, second edition, p. 778.

The utility of the present invention can be seen in the overall process of isobutylene production as shown in the drawing. A feed of dilute isobutylene 1 is passed into an absorption unit A containing sulfuric acid. The isobutylene is preferentially absorbed in the sulfuric acid, and passed as stream 3 to the desorption unit B. The other hydrocarbons 2 present in feed stream 1 pass off from the absorption unit A. In the desorption unit B the isobutylene is separated from the sulfuric acid 5 which can be recycled to the absorption unit A. The concentrated isobutylene 4 passes to the caustic wash unit C where it is contacted with caustic 6 which can be recovered 7 and recycled (not shown). The isobutylene 8 passes to a water wash unit D where it is contacted with water 9. The purified isobutylene 10 is recovered (not shown). The wash water 11 will contain some isobutanol produced in the desorption of isobutylene from the sulfuric acid. The wash water 11 is passed to a distillation tower E. Prior to entering the distillation tower E the antifoaming agent 14 is added to the wash water 11. In the distillation tower the isobutanol passes off overhead 12 and can be sold as such or recycled to the sulfuric acid absorption unit for conversion to isobutylene. The recovered water can be recycled (not shown) or safely disposed of by sewage treatment (not shown).

EXAMPLE 1

This example demonstrates the suppression of foam resulting from agitation. The runs were made at room temperature (about 22° C.). The apparatus used consisted of a 1000 ml. burette (5 cm. diameter) connected to a constant volume circulating pump via a bottom drain so that the liquid in the burette was pumped from the bottom and recycled to the top of the burette, being allowed to run down the side. The feed in each run was the wash water from a commercial isobutylene plant and contained about 2 percent by weight of tertiary butyl alcohol, with trace amounts of diisobutylene and unidentified alkyl sulfates. The antifoaming agent employed was dicoco-dimethyl quaternary ammonium chloride in a 75 percent by weight solution in isopropanol and having the following properties: average molecular weight 465, free amine less than 1.5, typical coco carbon chain compositions (by weight) saturate, $C_{10}$—2 percent, $C_{12}$—53 percent, $C_{14}$—24 percent, $C_{16}$—11 percent, $C_{18}$—5 percent; monounsaturate $C_{18}$—5 percent. 600 ml. of the wash water was charged to the column for each run. The stock solution of dicoco-dimethyl quaternary ammonium chloride (75 percent in isopropanol) was further diluted to a 4.5 percent solution with distilled water prior to use.

The test was run by adding the quantity of antifoaming agent indicated in the table to wash water and mixing prior to beginning the agitation. The results are shown in the table.

| Dicoco-dimethyl quaternary ammonium, p.p.m. | ml. of foam after 360 sec. |
|---|---|
| Run: | |
| 1 | [1] 400 |
| 2 ... 75 | 0 |
| 3 ... 38 | 140 |

[1] After 316 sec., at 360 seconds the foam overflowed the column.

EXAMPLE 2

This example demonstrates the distillation of the feed described in Example 1 and the foam suppression achieved.

The apparatus was a 2-inch I.D. glass Oldershaw continuous distillation column having 40 sieve trays and a heat source on the bottom. The feed to the column was on the 20th tray.

The column was heated to about 100° C. As soon as vapor flow up through the column was established foaming was observed. The foam covered the 40 trays and went over the top of the column, i.e. the column was flooded. At this point 75 p.p.m. dicoco-dimethyl quaternary ammonium chloride was added to the feed going to the column. After about 1 hour the foaming had stopped and the tower cleared.

The distillate recovered is the azeotrope of tertiary butyl alcohol and water.

The invention claimed is:

1. A method for suppressing the formulation of foam in an agitated aqueous solution of polar material, said method consisting essentially of adding to said solution a foam suppressing quantity of a mixture of quaternary ammonium salts which are soluble in said aqueous solution, said salts having the structure

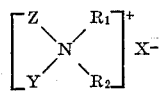

where $R_1$ and $R_2$ are alkyl radicals having 1 to 8 carbon atoms, Z and Y are hydrocarbon radicals having 8 to 18 carbon atoms and X is an anion selected from the group consisting of chlorine, bromine, and iodine.

2. The process according to claim 1 wherein the quaternary ammonium salt is present in an amount in the range of about 20 to 200 p.p.m.

3. The process according to claim 2 wherein the hydrocarbon radicals are selected from the group consisting of saturated, monounsaturated and diunsaturated.

4. The process according to claim 3 wherein $R_1$ and $R_2$ are the same.

5. The process according to claim 4 wherein $R_1$ and $R_2$ are methyl.

6. The process according to claim 2 wherein a temperature in the range of about 0 to 200° C. is employed.

7. The process according to claim 3 wherein the Z and Y hydrocarbon radicals correspond to the hydrocarbon chain of the fatty acids of coconut oil.

8. In a continuous process for distilling mixtures of polar organic compounds and water in a fractionating column, wherein the improvement comprises suppressing the formation of foam in the system by adding to said mixtures of organic compounds and water a foam suppressing quantity of a mixture of quaternary ammonium salts which are soluble in said mixtures of organic compounds and water, said salts having the structure

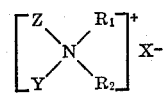

where $R_1$ and $R_2$ are alkyl radicals having 1 to 8 carbon atoms, Z and Y are radicals selected from the group consisting of saturated, monounsaturated and diunsaturated hydrocarbons having 8 to 18 carbon atoms and X is an anion selected from the group consisting of chlorine, bromine and iodine.

9. The process according to claim 8 wherein the quaternary ammonium salt is present in the range of about 20 to 200 p.p.m.

10. The process according to claim 9 wherein $R_1$ and $R_2$ are the same.

11. The process according to claim 10 wherein the mixture being distilled comprises less than 10 percent by weight of the polar organic compound.

12. The process according to claim 11 wherein tertiary butyl alcohol is present.

13. The process according to claim 12 wherein there is about 2 percent by weight of tertiary butyl alcohol.

14. The process according to claim 13 wherein $R_1$ and $R_2$ are methyl.

15. The process according to claim 14 wherein the Z and Y hydrocarbon radicals correspond to the hydrocarbon chains of the fatty acids of coconut oil.

16. The process according to claim 7 wherein $R_1$ and $R_2$ are methyl groups.

References Cited

UNITED STATES PATENTS

| | | | |
|---|---|---|---|
| 2,376,898 | 5/1945 | Boeckeler et al. | 203—20 |
| 2,583,771 | 1/1952 | Gunderson | 252—321 |
| 2,993,867 | 7/1961 | Wilson | 203—20 |
| 3,086,944 | 4/1963 | Wedell | 252—321 |
| 3,251,782 | 5/1966 | Hanzel et al. | 252—358 |
| 3,408,306 | 10/1968 | Boylan | 252—321 |
| 3,424,794 | 1/1969 | Miller | 252—358 |
| 1,981,635 | 11/1934 | Clarkson | 203—20 |
| 2,366,727 | 1/1945 | Gunderson | 260—567.6 M |
| 2,676,955 | 4/1954 | Wertkamp et al. | 260—567.6 M |
| 2,876,249 | 3/1959 | Haney | 260—567.6 M |
| 3,024,283 | 3/1962 | Metcalfe et al. | 260—567.6 B |
| 3,467,581 | 9/1969 | Privette et al. | 203—20 |

FOREIGN PATENTS

| | | | |
|---|---|---|---|
| 792,092 | 3/1958 | Great Britain | 260—567.6 M |

WILBUR L. BASCOMB, JR., Primary Examiner

U.S. Cl. X.R.

260—567.6 M, 643 R; 252—358

PO-1050
(5/69)

UNITED STATES PATENT OFFICE
CERTIFICATE OF CORRECTION

Patent No. 3,801,475     Dated  April 2, 1974

Inventor(s) William H. Taylor

It is certified that error appears in the above-identified patent and that said Letters Patent are hereby corrected as shown below:

Claim 1, line 1, reads "formulation" but should read ---formation---.

Signed and sealed this 29th day of October 1974.

(SEAL)
Attest:

McCOY M. GIBSON JR.
Attesting Officer

C. MARSHALL DANN
Commissioner of Patents